United States Patent [19]

Amlani et al.

[11] 4,338,825
[45] Jul. 13, 1982

[54] STRAIN GAGE LOAD CELL

[75] Inventors: Kish Amlani, Troy; Frederick J. Zink, Detroit; Craig Morgan, Novi; Thomas Ellwood, Mt. Clemens, all of Mich.

[73] Assignee: Eaton Corporation, Cleveland, Ohio

[21] Appl. No.: 197,369

[22] Filed: Oct. 15, 1980

[51] Int. Cl.³ .............................................. G01L 1/22
[52] U.S. Cl. ................................................. 73/862.65
[58] Field of Search ........................ 73/862.65, 862.62; 177/211, 229

[56] References Cited

U.S. PATENT DOCUMENTS

| | | | |
|---|---|---|---|
| 3,994,161 | 11/1976 | Trozera | 73/862.65 |
| 4,020,686 | 5/1977 | Brenoel | 73/862.62 |
| 4,103,545 | 8/1978 | Rykwalder et al. | 73/862.62 |
| 4,181,011 | 1/1980 | Brendel | 73/862.65 |

*Primary Examiner*—Anthony V. Ciarlante
*Attorney, Agent, or Firm*—Cullen, Sloman, Cantor, Grauer, Scott & Rutherford

[57] ABSTRACT

The load cell herein disclosed is designed for precise measurement of forces along or parallel to a single axis, while being substantially immune to forces applied along the other mutually perpendicular axes as well as moments applied about any of the three mutually perpendicular axes. Rigid force input and force output members are resiliently interconnected by a pair of parallel flexure beams which establish with such members a parallelogram type of linkage which is relatively yieldable to forces parallel to the selected measurement axis while being relatively stiff and unyieldable to forces parallel to the other two axes and to moments about any of the three axes. A strain gage-equipped sensing beam is mounted within the plane of the parallelogram linkage and between the two flexure beams. One end of the sensing beam is rigidly connected to the fixed force output member, while the other end is free to flex in cantilevered fashion responsive to displacement of the force input member. The sensing beam thereby provides part of the resilient interconnection between the force input and force output members, and is dimensioned so that its stiffness relative to that of the two flexure beams causes it to absorb 80 to 90% of the applied loads. Adjustable overload protection means are provided, which cause excessive forces to be safely by-passed around the resilient members and the strain gages.

7 Claims, 8 Drawing Figures

STRAIN GAGE LOAD CELL

BACKGROUND OF THE INVENTION

Strain gage type load cells capable of measuring forces along a single axis while being relatively immune to extraneous forces and moments are known in the art. Examples of such load cells are shown in U.S. Pat. Nos. 3,994,161; 4,022,288; 4,103,545; 4,181,011; and 4,196,784. These patents show the use of a parallelogram linkage comprising two parallel relatively massive and unyielding structures interconnected by two flexure beams which are dimensioned to be relatively compliant or yieldable to forces parallel to the single axis but being otherwise substantially unyielding to extraneous forces and moments. Also shown is the placement of a sensing beam between such flexure beams, either anchored at both ends to the unyielding structures or cantilevered from only one of such structures.

It is a principal object of the present invention to provide an improved strain gage type load cell having a high degree of accuracy in response to loads parallel to a predetermined axis, while having enhanced immunity to the effects of extraneous loads and moments. It is a further object of this invention to provide such a load cell which can be accurately fabricated with a minimum of machining operations, and which has improved protection of the resilient members and strain gages from accidental overloading in any direction.

SUMMARY OF THE INVENTION

The load cell of the present invention comprises a cantilever type sensing beam provided with strain gages, and mounted parallel to and between two flexure beams which interconnect rigid force input and force output members. One end of the cantilever sensing beam is anchored to the stationary force output member, while the load to be measured is applied to the other end of the sensing beam by a force-transmitting flexure beam which itself aids in preventing extraneous loads from being transmitted to the sensing beam. The arrangement of the rigid and resilient members reduces the amount of machining required and permits one basic structure to be readily modified by minimal dimensional changes during machining to establish a variety of useful capacity ranges. The configuration also permits the use of a simple adjustable threaded member to vary the overload at which the resilient members will be by-passed.

DETAILED DESCRIPTION OF THE DISCLOSURE

Figure 1:
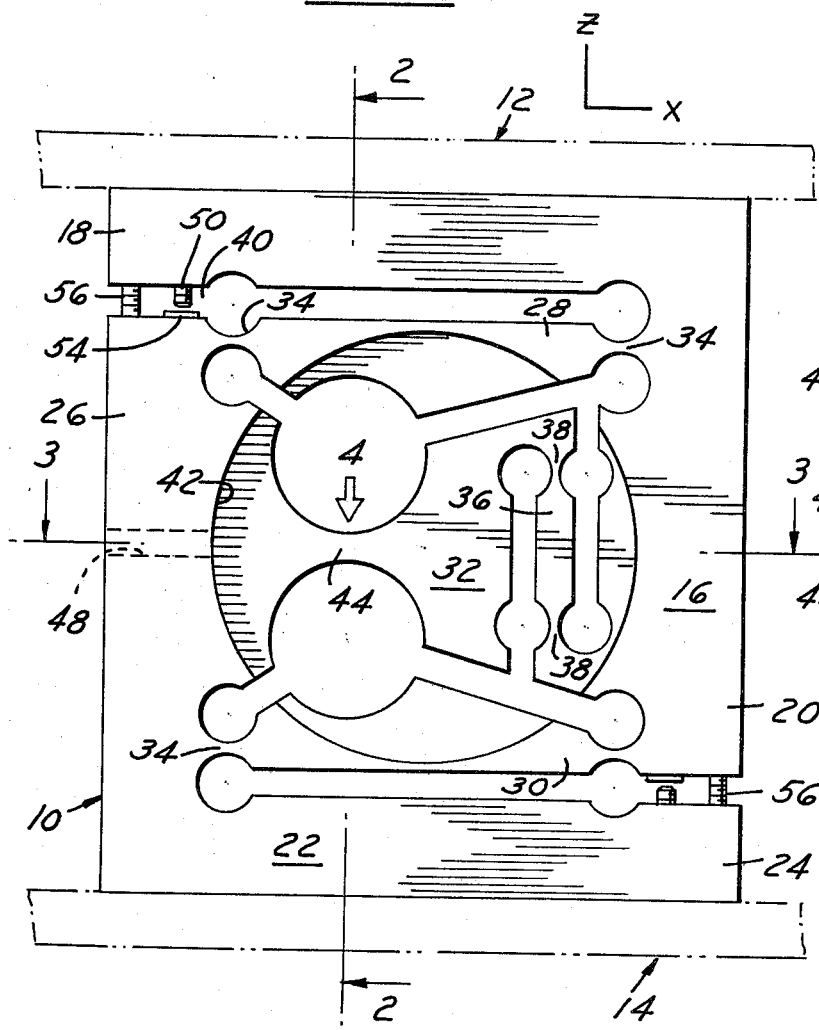
FIG. 1 is a front elevation of the load cell of the present invention, showing a portion of the force input structure and the supporting structure in phantom.
Figure 2:
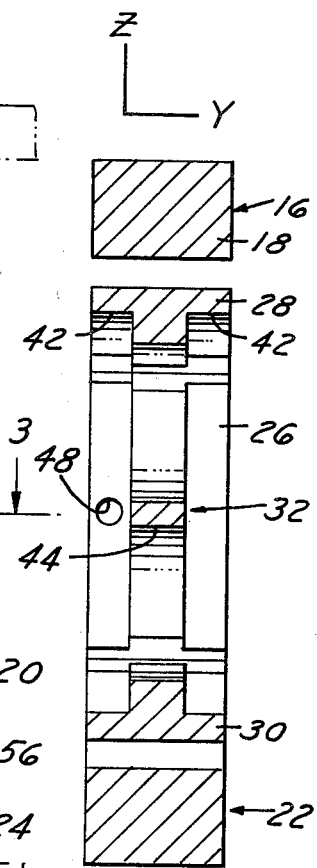
FIG. 2 is a cross section viewed in the direction of arrows 2—2 of FIG. 1.
Figure 3:
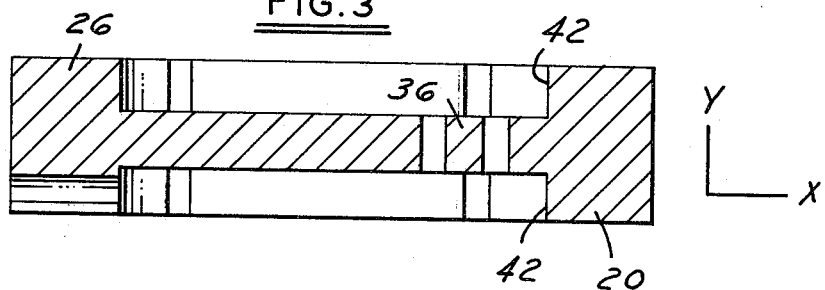
FIG. 3 is a cross section viewed in the direction of arrows 3—3 of FIG. 1.
Figure 5:
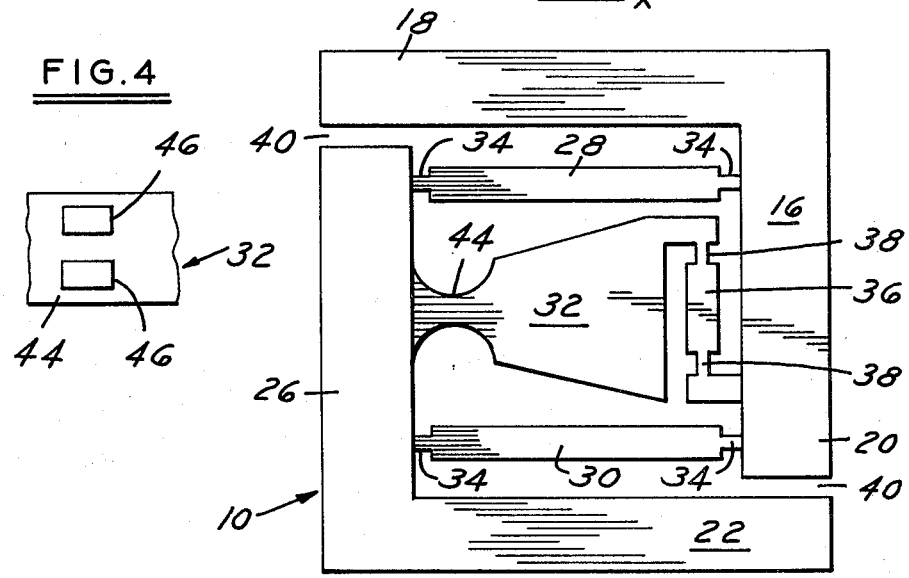
FIG. 5 is a front elevational view, similar to FIG. 1, but showing the structure of FIG. 1 in simplified schematic form.

Referring to FIG. 1 of the drawings and its schematic equivalent in FIG. 5, load cell 10 of the present invention is shown in an application such as a highly accurate scale for precise measurement of the quantity of food being packaged in a container. Load cell 10 is shown mounted between an upper weighing platform 12 and a lower stationary base or support 14, both shown fragmentarily in phantom. The force or load to be measured is applied along the illustrated Z axis and would most commonly be applied downwardly through platform 12 into load cell 10.

The load cell generally comprises an inverted L-shaped rigid force input structure 16 having a horizontal upper leg 18 which may be bolted to platform 12 and a vertical leg 20 descending from the right end of leg 18. The load cell further comprises an oppositely arranged rigid L-shaped force output structure 22 having a horizontal lower leg 24 secured to base 14 and a vertical leg 26 along the left edge of the structure. These two structures 16 and 22, which are sufficiently rigid to be essentially non-yielding within the contemplated range of loads, are resiliently interconnected by three elements. The first two of these elements are upper and lower flexure beams 28, 30, respectively, and the third element includes cantilevered sensing beam 32, to be further described below.

Flexure beams 28, 30 are provided with end portions 34 of reduced section depth in the Z axis direction, to function as hinge points to permit the structure defined by vertical legs 20 and 26 and beams 28 and 30 to function as a flexible parallelogram in response to loads applied parallel to the Z axis.

The third interconnecting element comprises, in addition to cantilevered sensing beam 32, a force transmitting or directing beam 36 arranged parallel to the Z axis and connected at one end to the free end of beam 32 and at its other end to vertical leg 20 of force input structure 16. Force transmitting beam 36 is provided with end portions 38 of reduced section depth in the X axis direction to function as hinge points so that such beam will be flexible so as not to transmit to sensing beam 32 forces parallel to the X axis.

Clearances or gaps 40 are provided between the adjacent portions of the force input and output structures 16 and 22 and flexure beams 30, 32, to permit a controlled amount of deflection of the vertically movable force input structure relative to the stationary force output structure. The effective size of the clearance is further controlled by an overload protection feature, to be described below.

Figure 4:
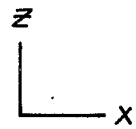
FIG. 4 is a fragmentary plan view of a portion of the sensing beam, viewed in the direction of arrow 4 of FIG. 1.

The front and rear faces of load cell 10 are provided with generally circular cavities or depressions 42, which reduce the thickness of certain of the elements and make them more compliant or responsive, to a controlled degree, to certain of the applied loads. Sensing beam 32 is relatively massive and rigid at its left end, but is provided with a neck 44 of reduced depth in the Z axis direction to concentrate the stresses at a point where the strain gages 46 may be applied to its upper and lower surfaces, as shown in FIG. 4. These strain gages are symmetrically arranged about the minimum depth point at the central vertical plane defined by axes Z-X. The strain gages are bonded to the surface of the beam in the conventional manner, as will be understood by those skilled in the art. Access hole 48 is provided in a vertical leg 26 to permit passage of the necessary electrical cable. The strain gage tabs (not illustrated) are preferably mounted away from neck 44, in lower stress areas, such as at the extreme left end of sensing beam 32 or along the cylindrical edge wall of cavity 42.

The curved shape of sensing beam 32 facilitates placement of the strain gages at the point of maximum stress, as is preferred, but also provides maximum beam stiffness for a given level of sensitivity, which is also desirable. The attachment of the strain gage tabs at closely adjacent yet substantially stiffer parts of the structure is also advantageous, to eliminate beam-reinforcing effects of the connecting wires and solder joints, which could otherwise affect the accuracy of the load cell.

Figure 6:
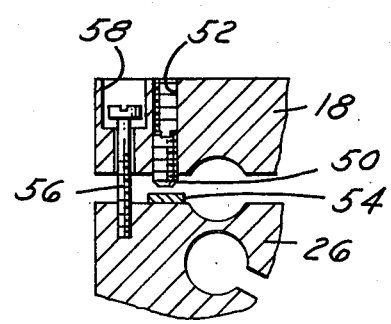
FIG. 6 is a fragmentary cross-sectional detail of the overload safety feature of the present invention.

An overload protection system is provided to prevent excessive deflection of the sensing beam which could damage the strain gages. This system is shown in detail in FIG. 6, and comprises a first overload screw 50 which is threaded into internally threaded hole 52 in horizontal leg 18 and extends downward into the clearance gap 40. The lower tip of screw 50 is normally spaced a small predetermined distance above a hardened pad 54, which screw 50 abuts whenever a downward force in excess of a predetermined safe level is applied to the load cell. The vertical position of screw 50 within hole 52 is therefore adjusted as desired to establish the level of downward loading which be permitted before the load cell will bottom out and cease to transmit additional forces to the sensing beam. Once screw 50 bottoms out on pad 54, such additional forces are safely by-passed from leg 18 directly through vertical leg 26 and horizontal leg 22 to base 14.

Excessive loading from upward forces is prevented by a second overload screw 56 which freely passes through a shouldered clearance hole 58 in leg 18 and is threaded into a threaded hole in leg 26. The vertical gap between the shoulder of hole 58 and the underside of the head of screw 56 will control the amount of upward force can be applied to leg 18 before the load cell bottoms out to rigidly connect leg 18 to leg 26. In this manner, excessive upward as well as downward forces applied to the load cell can be readily by-passed around the sensing beam and other delicate components. Alternatively, screws 50 and 56 may be spaced transversely from each other, rather than longitudinally.

It is preferred that a similar overload screw arrangement will be provided in the lower right corner of the structure of FIG. 1, that is, between the right end of horizontal leg 24 and the bottom of vertical leg 20. In this fashion, any overload will be absorbed by the two devices.

The operation of the load cell in response to various applied forces and moments will now be described. Visualization of the operation of the load cell will be aided by reference to FIG. 5, which, due to its schematic presentation, eliminates much of the extraneous structural details illustrated in FIG. 1. As will be understood by those skilled in the art, the placement of sensing beam 32 midway between upper and lower flexure beams 28, 30 results in the isolation of the sensing beam from certain of the extraneous forces and moments. Other residual or extraneous forces will be cancelled out by the Wheatstone bridge arrangement (not illustrated) in which the four strain gages 46 may be conventionally wired.

When a force to be measured is applied along or parallel to the Z axis, force input structure 16 will resiliently deflect downwardly parallel to the Z axis as a result of the parallelogram linkage described above. Because the hinge point or flexural pivot points 34 are readily compliant or flexible in response to forces along such axis, a substantial portion of the force will be absorbed by sensing beam 32, with maximum strain occurring at neck 44. Of course, as explained above, the downward deflection of force input structure 16 will be transferred into the free end of sensing beam 32 by the force directing or transmitting beam 36. Beam 36 is relatively stiff in response to tensile loads applied along its vertical axis, so it will experience substantially no axial elongation, with the result that virtually all of the downward deflection of force input structure will be communicated to the right end of sensing beam 32. The relative stiffnesses of flexural pivots 34 and neck 44 are selected so that sensing beam 32 will preferably absorb at least 80 percent of a load along the Z axis, for maximum accuracy of response.

As long as the magnitude of the force along the Z axis is below a predetermined limit, so as not to cause horizontal leg 18 to deflect more than is permitted by overload screws 50 and 56, the output of the strain gages will accurately measure the magnitude of the applied load.

The load cell is designed so as to be relatively immune from the specific point of application of the force in the direction of the Z axis. If such force is applied at a point toward the extreme right or left of the structure, a moment about the Y axis will be produced, which moment will be absorbed by the widely spaced upper and lower flexure beams 28, 30, and these beams will absorb such moment by axial compressive forces in one of the beams and axial tensile forces in the other of the beams. Such beams are dimensioned to be relatively stiff in response to forces directed along their longitudinal axes. The placement of sensing beam mid-way between these two beams, plus the weakness of flexural pivots 38 to forces in the X direction, minimizes the likelihood of any undesired axial loading of sensing beam 32.

Similarly, moments about the Y axis will also tend to be resiliently absorbed by flexure beams 28, 30, thereby isolating sensing beam 32 from such forces.

Extraneous forces applied parallel to the X axis will have the same effect and will be absorbed in the same fashion as moments about the Y axis, as described above.

Moments about the X axis will be absorbed primarily by shear forces created in upper and lower flexural beams 28, 30. Again, the relatively wide vertical spacing between such beams helps to reduce the magnitude of the forces they will experience in response to such moments. To a lesser extent, shear forces will also be created in force transmitting beam 36 and flexural pivots 38.

Forces along the Y axis will produce the same effects as the above-described moments about the X axis.

Finally, moments about the Z axis will also be resisted by shear forces, primarily in beams 28, 30 and to a lesser extent by shear forces in beam 36.

Figure 7:
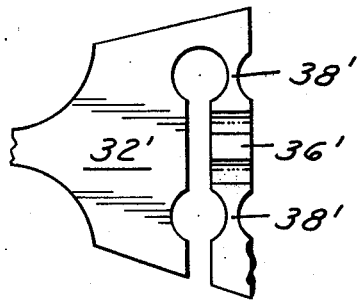
FIG. 7 is a fragmentary front elevational view, similar to FIG. 1, but showing a modified force transmitting beam.
Figure 8:
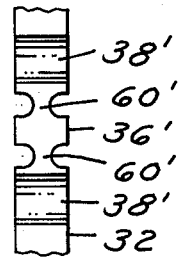
FIG. 8 is a fragmentary side view of the force transmitting beam of FIG. 7.

FIGS. 7 and 8 illustrate in front and side fragmentary views a modified embodiment wherein force transmitting beam 36 is more compliant or resilient to forces along the Y axis or moments about the X axis, thereby helping to isolate sensing beam 32 from such extraneous forces. This result is accomplished by providing additional hinge points 60' of reduced cross-section in the Y direction which function to increase the compliance of such beam in response to these forces and moments.

Other modifications which may prove to be desirable, while retaining essentially the same configuration, involve relocating the neck portion 44 of sensing beam 32 toward the right to a point nearer the vertical center line of symmetry of the load cell. Such a placement may aid in eliminating the effect of bending moments induced by the lack of perfect alignment of the point of load application with the strain gage location. Alternatively, such bending moments may be more effectively isolated by shifting the location of force transmitting beam 36 toward the left until it is aligned with the vertical center line of symmetry of the load cell. Applicants have not as yet constructed load cells having these latter two configurations, so no experimental data is yet available comparing the performance of these three slightly different configurations. However, the basic coaction of the various elements would be common to all three configurations, with only differences in magnitude of extraneous forces possibly varying from one configuration to the other.

The seemingly complicated and elaborate shape of the structure of FIG. 1, while being functionally identical to the simplified schematic of FIG. 5, results from machining considerations. The illustrated load cell can be cut from plate stock of the desired height and thickness. Thereafter, opposed cavities 42 can be readily machined in the two faces, to establish the desired reduction of cross-section of the resilient members along the Y axis. The circular openings and slots can be readily machined by simple drilling or milling operations in order to achieve the desired thickness of the various hinge points. The critical dimensional points are all arcuate, to accommodate the simplest drilling or milling steps. The arcuate shape of neck 44 is particularly advantageous as a way to maximize the stress at the narrow section, while retaining stiffness and lower stresses in the remainder of beam 32.

The disclosed shape and machining techniques are also advantageous in that they permit the same load cell blank and design to be used for several load capacity ranges, simply by using a larger or smaller diameter drill or milling tool or by changing spacing of these holes to thereby narrow or widen the thickness of the flexural pivot points.

The use of the two rigid L-shaped structures 16, 22 not only permits a simple and adjustable overload protection device, as described above, but also eliminates the need for supplementary force input and reaction brackets; the necessary bolted connections for which would introduce potential slippage and inaccuracy of load cell output.

This invention may be further developed within the scope of the following claims. Accordingly, the above specification is to be interpreted as illustrative of only a few operative embodiments of the present invention, rather than in a strictly limited sense.

We now claim:

1. In a load cell of the type which measures forces along and parallel to a first axis, comprising:
   a substantially rigid force input structure to which the force to be measured is applied;
   a substantially rigid force output structure adapted to be supported on a stationary reaction surface;
   said force input and force output structures being in the form of oppositely oriented generally L-shaped structures, a first leg of said force input structure receiving the force to be measured and a first leg of said force output structure engaging the reaction surface, said first two legs being generally parallel to each other and at right angles to the first axis, the second legs of each of said structures being generally parallel to each other and to the first axis,
   said force input and output structures being normally spaced from each other and interconnected for resilient relative movement in the direction of the first axis by resilient means including upper and lower flexure beams which are parallel to and between said first legs, said force input and output structures and said flexure beams defining a resilient parallelogram linkage lying in a plane parallel to the first axis, said flexure beams and their end connections being dimensioned and proportioned to be resilient to a relatively large degree to forces parallel to the first axis, while being relatively stiffer to forces in all other directions;
   said resilient means further including a sensing beam located between and parallel to said flexure beams, one end of said sensing beam being rigidly connected to said second leg of said force output structure and the other end of said sensing beam being connected to said second leg of said force input structure by a connection which is relatively flexible to the forces parallel to the axis of said sensing beam but which is substantially rigid to forces in the direction of the first axis;
   said sensing beam being provided with strain gages which produce a signal responsive to the bending of said beam induced by forces applied to the load cell in a direction parallel to the first axis.

2. The load cell of claim 1 wherein said sensing beam acts as a cantilevered beam, said connection between said other end of said sensing beam and said force input structure being a third flexure beam whose longitudinal axis is parallel to the first axis.

3. The load cell of claim 2 wherein said third flexure beam and its end connections are proportioned and dimensioned to be resilient to a relatively large degree to forces parallel to the second and third axes while being relatively rigid to forces along its longitudinal axis.

4. The load cell of claim 1 wherein the depth of the cross-section of said sensing beam measured in a direction parallel to the first axis varies along the length of said sensing beam as a result of concavely curved opposed beam surfaces, said strain gages being applied to said beam in the zone of minimum section depth.

5. The load cell of claim 1 wherein adjustable overload protection means are provided to establish a direct abutment between one leg of said force input structure and the non-parallel leg of said force output structure when a load in excess of a predetermined magnitude is applied to said load cell.

6. The load cell of claim 5 wherein said overload protection means comprises a threaded member having a first end which is threaded into one of said structures and a second end which is normally spaced from the other of said structures by a gap which is adjustable by the threaded advance or withdrawal of said member.

7. The load cell of claim 1 wherein said force input and force output structures are provided with overload protection means in the form of a first threaded member whose axis is parallel to the first axis and which is threaded at one end into one of said structures while its opposite end is provided with an enlarged head received in an oversize counterbored clearance hole in the other of said structures, said first threaded member being normally spaced from any contact with said other structure within the range of forces which the device is intended to safely absorb, said head being normally laterally spaced from the side walls of said counterbored hole and being normally axially spaced from the shoulder of the counterbore; said overload protection means further comprising a second threaded member parallel to the first axis and having a first end threaded into said other of said structures and a second end which is axially spaced from said one structure; whereby the permissible loading of the load cell can be adjustably controlled by the selection of said axial spaces between each of said threaded members and said structures, any loads along said first axis in excess of a predetermined magnitude causing deflection of one of said structures relative to the other sufficient to eliminate one of said axial spaces to by-pass any excessive loads around said sensing beam.

* * * * *